United States Patent
Ooms et al.

(10) Patent No.: US 6,608,231 B1
(45) Date of Patent: *Aug. 19, 2003

(54) DOUBLE-METAL CYANIDE CATALYSTS FOR PRODUCING POLYETHER POLYOLS

(75) Inventors: Pieter Ooms, Krefeld (DE); Jörg Hofmann, Krefeld (DE); Pramod Gupta, Bedburg (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/787,130

(22) PCT Filed: Sep. 3, 1999

(86) PCT No.: PCT/EP99/06474

§ 371 (c)(1),
(2), (4) Date: Mar. 13, 2001

(87) PCT Pub. No.: WO00/15337

PCT Pub. Date: Mar. 23, 2000

(30) Foreign Application Priority Data

Sep. 16, 1998 (DE) .......................... 198 42 383

(51) Int. Cl.[7] .......................... C07C 43/11; B01J 31/02
(52) U.S. Cl. .................. 568/613; 568/618; 568/620; 568/623; 568/624; 568/625; 502/152; 502/154; 502/159; 502/156; 502/162; 502/167; 502/153; 502/155; 502/175; 502/172; 502/165; 502/166
(58) Field of Search .................. 568/613, 618, 568/620, 623, 624, 625; 502/152, 153, 154, 155, 156, 162, 165, 166, 167, 172, 175

(56) References Cited

U.S. PATENT DOCUMENTS

| 3,404,109 | A |   | 10/1968 | Milgrom .................. 260/611 |
| 3,829,505 | A |   | 8/1974  | Herold ................... 260/611 B |
| 3,941,849 | A |   | 3/1976  | Herold ................... 260/607 A |
| 4,477,589 | A |   | 10/1984 | van der Hulst et al. ..... 502/169 |
| 5,158,922 | A |   | 10/1992 | Hinney et al. ............. 502/175 |
| 5,470,813 | A |   | 11/1995 | Le-Khac .................. 502/175 |
| 5,545,601 | A |   | 8/1996  | Le-Khac .................. 502/156 |
| 5,627,120 | A |   | 5/1997  | Le-Khac .................. 502/156 |
| 5,714,428 | A |   | 2/1998  | Le-Khac .................. 502/159 |
| 6,018,017 | A |   | 1/2000  | Le-Khac .................. 528/421 |
| 6,323,375 | B1 | * | 11/2001 | Hofmann et al. ........... 502/152 |
| 6,376,420 | B1 | * | 4/2002  | Ooms et al. .............. 502/150 |

FOREIGN PATENT DOCUMENTS

JP         4145123       5/1992

* cited by examiner

*Primary Examiner*—Rosalynd Keys
(74) *Attorney, Agent, or Firm*—Joseph C. Gil; John E. Mrozinski, Jr.

(57) ABSTRACT

The invention relates to novel double metal cyanide (DMC) catalysts for the preparation of polyether polyols by polyaddition of alkylene oxides to starter compounds containing active hydrogen atoms, wherein the catalyst contains a) double metal cyanide compounds, b) organic complex ligands other than c), and c) carboxylic acid ester of polyhydric alcohols. The catalysts according to the invention have greatly increased activity in the preparation of polyether polyols.

15 Claims, No Drawings

DOUBLE-METAL CYANIDE CATALYSTS FOR PRODUCING POLYETHER POLYOLS

This application is a 371 of PCT/EP99/06474, filed Sep. 3, 1999.

The invention relates to novel double metal cyanide (DMC) catalysts for the preparation of polyether polyols by polyaddition of alkylene oxides to starter compounds containing active hydrogen atoms.

Double metal cyanide (DMC) catalysts for the polyaddition of alkylene oxides to starter compounds containing active hydrogen atoms are known (see, for example, U.S. Pat. Nos. 3,404,109, 3,829,505, 3,941,849 and 5,158,922). The use of those DMC catalysts for the preparation of polyether polyols brings about in particular a reduction in the proportion of monofunctional polyethers having terminal double bonds, so-called monools, in comparison with the conventional preparation of polyether polyols by means of alkali catalysts, such as alkali hydroxides. The polyether polyols so obtained can be processed to high-quality polyurethanes (e.g. elastomers, foams, coatings). DMC catalysts are usually obtained by reacting an aqueous solution of a metal salt with the aqueous solution of a metal cyanide salt in the presence of an organic complex ligand, for example an ether. In a typical catalyst preparation, for example, aqueous solutions of zinc chloride (in excess) and potassium hexacyanocobaltate are mixed, and dimethoxyethane (glyme) is then added to the suspension formed. After filtration and washing of the catalyst with aqueous glyme solution, an active catalyst of the general formula

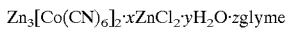

$$Zn_3[Co(CN)_6]_2 \cdot xZnCl_2 \cdot yH_2O \cdot zglyme$$

is obtained (see, for example, EP 700 949).

From JP 4 145 123, U.S. Pat. No. 5,470,813, EP 700 949, EP 743 093, EP 761 708 and WO 97/40086 there are known DMC catalysts which, by the use of tert.-butanol as organic complex ligand (alone or in combination with a polyether (EP 700 949, EP 761 708, WO 97/40086)), further reduce the proportion of monofunctional polyethers having terminal double bonds in the preparation of polyether polyols.

Moreover, the use of those DMC catalysts reduces the induction time in the polyaddition reaction of the alkylene oxides with appropriate starter compounds and increases the catalyst activity.

The object of the present invention was to make available further improved DMC catalysts for the polyaddition of alkylene oxides to appropriate starter compounds, which catalysts exhibit increased catalyst activity as compared with the catalyst types known hitherto. By shortening the alkoxylation times, this leads to an improvement in the process for preparing polyether polyols in terms of economy. Ideally, as a result of the increased activity, the catalyst can then be used in such low concentrations (25 ppm or less) that the very expensive separation of the catalyst from the product is no longer necessary and the product can be used directly for the preparation of polyurethanes.

Surprisingly, it has now been found that DMC catalysts that contain a carboxylic acid ester of polyhydric alcohols as complex ligand possess greatly increased activity in the preparation of polyether polyols.

Accordingly, the present invention provides a double metal cyanide (DMC) catalyst containing a) one or more, preferably one, double metal cyanide compound(s),
b) one or more, preferably one, organic complex ligand(s) other than c), and
c) one or more, preferably one, carboxylic acid ester(s) of polyhydric alcohols.

The catalyst according to the invention may optionally contain d) water, preferably from 1 to 10 wt. %, and/or e) one or more water-soluble metal salts, preferably from 5 to 25 wt. %, of formula (I) $M(X)_n$ from the preparation of the double metal cyanide compounds a). In formula (I), M is selected from the metals Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III). Zn(II), Fe(II), Co(II) and Ni(II) are especially preferred. The substituents X are identical or different, preferably identical, and represent an anion, preferably selected from the group consisting of halides, hydroxides, sulfates, carbonates, cyanates, thiocyanates, isocyanates, isothiocyanates, carboxylates, oxalates and nitrates. The value of n is 1, 2 or 3.

The double metal cyanide compounds a) contained in the catalysts according to the invention are the reaction products of water-soluble metal salts and water-soluble metal cyanide salts.

Water-soluble metal salts suitable for the preparation of double metal cyanide compounds a) preferably have the general formula (I) $M(X)_n$, wherein M is selected from the metals Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III). Zn(II), Fe(II), Co(II) and Ni(II) are especially preferred. The substituents X are identical or different, preferably identical, and represent an anion, preferably selected from the group consisting of halides, hydroxides, sulfates, carbonates, cyanates, thiocyanates, isocyanates, isothiocyanates, carboxylates, oxalates and nitrates. The value of n is 1, 2 or 3.

Examples of suitable water-soluble metal salts are zinc chloride, zinc bromide, zinc acetate, zinc acetylacetonate, zinc benzoate, zinc nitrate, iron(II) sulfate, iron(II) bromide, iron(II) chloride, cobalt(II) chloride, cobalt(II) thiocyanate, nickel(II) chloride and nickel(II) nitrate. Mixtures of various water-soluble metal salts may also be used.

Water-soluble metal cyanide salts suitable for the preparation of double metal cyanide compounds a) preferably have the general formula (II) $(Y)_a M'(CN)_b (A)_c$, wherein M' is selected from the metals Fe(II), Fe(III), Co(II), Co(III), Cr(II), Cr(III), Mn(II), Mn(III), Ir(III), Ni(II), Rh(III), Ru(II), V(IV) and V(V). M' is selected especially from the metals Co(II), Co(III), Fe(II), Fe(III), Cr(III), Ir(III) and Ni(II). The water-soluble metal cyanide salt may contain one or more of those metals. The substituents Y are identical or different, preferably identical, and represent an alkali metal ion or an alkaline earth metal ion. The substituents A are identical or different, preferably identical, and represent an anion selected from the group consisting of halides, hydroxides, sulfates, carbonates, cyanates, thiocyanates, isocyanates, isothiocyanates, carboxylates, oxalates and nitrates. a as well as b and c are integers, the values for a, b and c being so selected that the metal cyanide salt is electroneutral; a is preferably 1, 2, 3 or 4; b is preferably 4, 5 or 6; c preferably has the value 0. Examples of suitable water-soluble metal cyanide salts are potassium hexacyanocobaltate(III), potassium hexacyanoferrate(II), potassium hexacyanoferrate(III), calcium hexacyanocobaltate(III) and lithium hexacyanocobaltate (III).

Preferred double metal cyanide compounds a) contained in the catalysts according to the invention are compounds of the general formula (III)

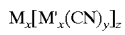

wherein

M is as defined in formula (I) and

M' is as defined in formula (II) and x, x', y and z are integers and are so selected that the double metal cyanide compound has electro neutrality.

Preferably, x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds will be found in, for example, U.S. Pat. No. 5,158,922 (column 8, lines 29–66). The use of zinc hexacyanocobaltate(III) is especially preferred.

The organic complex ligands b) contained in the DMC catalysts according to the invention are in principle known and are described in detail in the prior art (see, for example, U.S. Pat. No. 5,158,922, especially column 6, lines 9–65, U.S. Pat. Nos. 3,404,109, 3,829,505, 3,941,849, EP 700 949, EP 761 708, JP 4 145 123, U.S. Pat. No. 5,470,813, EP 743 093 and WO 97/40086). Preferred organic complex ligands are water-soluble organic compounds having hetero atoms, such as oxygen, nitrogen, phosphorus or sulfur, which are able to form complexes with the double metal cyanide compound a). Suitable organic complex ligands are, for example, alcohols, aldehydes, ketones, ethers, esters, amides, ureas, nitriles, sulfides and mixtures thereof. Preferred organic complex ligands are water-soluble aliphatic alcohols, such as ethanol, isopropanol, n-butanol, isobutanol, sec.-butanol and tert.-butanol. Tert.-butanol is especially preferred.

The organic complex ligand is added either during preparation of the catalyst or immediately after precipitation of the double metal cyanide compound a). The organic complex ligand is usually employed in excess.

The DMC catalysts according to the invention contain the double metal cyanide compounds a) in amounts of from 20 to 90 wt. %, preferably from 25 to 80 wt. %, based on the amount of finished catalyst, and the organic complex ligands b) in amounts of from 0.5 to 30 wt. %, preferably from 1 to 25 wt. %, based on the amount of finished catalyst. The DMC catalysts according to the invention usually contain from 1 to 50 wt. %, preferably from 1 to 20 wt. %, based on the amount of finished catalyst, of carboxylic acid esters of polyhydric alcohols.

The carboxylic acid esters of polyhydric alcohols contained in the catalysts according to the invention are, for example, esters of $C_2$–$C_{30}$-carboxylic acids with aliphatic or alicyclic alcohols having two or more hydroxyl groups per molecule, such as ethylene glycol, 1,2-propanediol, 1,3-propanediol, diethylene glycol, triethylene glycol, 1,2,3-propanetriol (glycerol), 1,3-butanediol, 1,4-butanediol, butanetriol, 1,6-hexanediol, 1,1,1-trimethylolethane, 1,1,1-trimethylolpropane, pentaerythritol, carbohydrates (sugars) or sugar alcohols, such as sorbitol or sorbitan. Suitable sugars are monosaccharides, such as glucose, galactose, mannose, fructose, arabinose, xylose or ribose, disaccharides, such as saccharose or maltose, and oligo- or poly-saccharides, such as starch.

There are suitable as the carboxylic acid component, for example, $C_2$–$C_{30}$-carboxylic acids, such as aryl-, aralkyl- and alkyl-carboxylic acids, preferably aralkyl- and alkyl-carboxylic acids, especially alkylcarboxylic acids, such as acetic acid, butyric acid, isovaleric acid, caproic acid, caprylic acid, capric acid, lauric acid, myristic acid, palmitic acid, stearic acid, oleic acid, linoleic acid or linolenic acid.

Carboxylic acid esters of polyhydric alcohols that are preferably used are esters of 1,2,3-propanetriol (glycerol), 1,1,1-trimethylolpropane, pentaerythritol, maltose or sorbitan with $C_2$–$C_{18}$-alkylcarboxylic acids.

Especially preferred carboxylic acid esters of polyhydric alcohols are mono-, di- or tri-esters of 1,2,3-propanetriol (glycerol); mono-, di-, tri- or tetra-esters of pentaerythritol; and mono-, di-, tri- or tetra-esters of sorbitan with $C_2$–$C_{18}$-alkylcarboxylic acids.

Methods for the preparation of carboxylic acid esters of polyhydric alcohols or isolation from fats are generally well known and are described in detail, for example, in "Kirk-Othmer, Encyclopedia of Chemical Technology", Vol. 9, 3rd edition, 1980, p. 795 ff; "Römpp, Lexikon Chemie", p. 1571, 10th edition, Stuttgart/New York, 1997; "Ullmann's Encyclopedia of Industrial Chemistry", Volume A10, 5th edition, 1987, p. 173 to 218.

It is also possible to use any desired mixtures of the above-mentioned carboxylic acid esters of polyhydric alcohols. The polyhydric alcohols may be esterified by identical carboxylic acids or by carboxylic acids that are different from one another.

Analysis of the catalyst composition is usually carried out by means of elemental analysis, thermogravimetry or removal by extraction of the content of carboxylic acid ester of polyhydric alcohols, with subsequent gravimetric determination.

The catalysts according to the invention may be crystalline, partially crystalline or amorphous. Analysis of the crystallinity is usually carried out by powder X-ray diffraction.

Preference is given to catalysts according to the invention containing a) zinc hexacyanocobaltate(III), b) tert.-butanol and c) a carboxylic acid ester of polyhydric alcohols.

Preparation of the DMC catalysts according to the invention is usually carried out in aqueous solution by reacting α) metal salts, especially of formula (I), with metal cyanide salts, especially of formula (II), β) organic complex ligands b) other than carboxylic acid esters of polyhydric alcohols, and γ) carboxylic acid esters of polyhydric alcohols.

In the preparation it is preferable first to react the aqueous solutions of the metal salt (e.g. zinc chloride used in stoichiometric excess (at least 50 mol %, based on the metal cyanide salt)) and of the metal cyanide salt (e.g. potassium hexacyanocobaltate) in the presence of the organic complex ligand b) (e.g. tert.-butanol), there being formed a suspension which contains the double metal cyanide compound a) (e.g. zinc hexacyanocobaltate), water d), excess metal salt e) and the organic complex ligand b).

The organic complex ligand b) may be present in the aqueous solution of the metal salt and/or of the metal cyanide salt, or it is added directly to the suspension obtained after precipitation of the double metal cyanide compound a). It has proved advantageous to mix the aqueous solutions and the organic complex ligand b), with vigorous stirring. The suspension formed is then usually treated with the carboxylic acid ester of polyhydric alcohols c). The carboxylic acid ester of polyhydric alcohols c) is preferably used in a mixture with water and organic complex ligand b).

The catalyst is then isolated from the suspension by known techniques, such as centrifugation or filtration. In a preferred variant, the isolated catalyst is then washed with an aqueous solution of the organic complex ligand b) (e.g. by being re-suspended and subsequently isolated again by filtration or centrifugation). In that manner it is possible to remove, for example, water-soluble by-products, such as potassium chloride, from the catalyst according to the invention.

The amount of organic complex ligand b) in the aqueous washing solution is preferably from 40 to 80 wt. %, based on the total solution. Furthermore, it is advantageous to add to the aqueous washing solution a small amount of carboxylic acid ester of polyhydric alcohols, preferably in the range of from 0.5 to 5 wt. %, based on the total solution.

It is also advantageous to wash the catalyst more than once. To that end, the first washing procedure may be repeated, for example. It is, however, preferred to use non-aqueous solutions for further washing procedures, for example a mixture of organic complex ligand and carboxylic acid ester of polyhydric alcohols.

The washed catalyst, optionally after pulverisation, is then dried at temperatures of generally from 20 to 100° C. and at pressures of generally from 0.1 mbar to normal pressure (1013 mbar).

The present invention relates also to the use of the DMC catalysts according to the invention in a process for the preparation of polyether polyols by polyaddition of alkylene oxides to starter compounds containing active hydrogen atoms.

There are used as alkylene oxides preferably ethylene oxide, propylene oxide, butylene oxide and mixtures thereof. The synthesis of the polyether chains by alkoxylation may be carried out, for example, with only one monomeric epoxide or in a random or block manner with 2 or 3 different monomeric epoxides. Further details will be found in "Ullmanns Encyclopädie der industriellen Chemie", English language edition, 1992, Vol. A21, pages 670–671.

There are preferably used as starter compounds containing active hydrogen atoms compounds having molecular weights of from 18 to 2000 and having from 1 to 8 hydroxyl groups. There may be mentioned by way of example: ethylene glycol, diethylene glycol, triethylene glycol, 1,2-propylene glycol, 1,4-butanediol, hexamethylene glycol, bisphenol A, trimethylolpropane, glycerol, pentaerythritol, sorbitol, cane sugar, decomposed starch or water.

Advantageously, the starter compounds containing active hydrogen atoms that are used are those which have been prepared, for example, by conventional alkali catalysis from the above-mentioned low molecular weight starters and which are oligomeric alkoxylation products having molecular weights of from 200 to 2000.

The polyaddition, catalysed by the catalysts according to the invention, of alkylene oxides to starter compounds containing active hydrogen atoms is generally carried out at temperatures of from 20 to 200° C., preferably in the range of from 40 to 180° C., especially at temperatures of from 50 to 150° C. The reaction may be carried out at total pressures of from 0 to 20 bar. The polyaddition may be carried out without a solvent or in an inert organic solvent, such as toluene and/or THF. The amount of solvent is usually from 10 to 30 wt. %, based on the amount of polyether polyol to be prepared.

The catalyst concentration is so selected that good control of the polyaddition reaction under the given reaction conditions is possible. The catalyst concentration is generally in the range of from 0.0005 wt. % to 1 wt. %, preferably in the range of from 0.001 wt. % to 0.1 wt. %, especially in the range of from 0.001 to 0.0025 wt. %, based on the amount of polyether polyol to be prepared.

The molecular weights of the polyether polyols prepared by the process according to the invention are in the range of from 500 to 100,000 g/mol, preferably in the range of from 1000 to 50,000 g/mol, especially in the range of from 2000 to 20,000 g/mol.

The polyaddition may be carried out continuously or discontinuously, for example in a batch or semi-batch process.

On account of their markedly increased activity, the catalysts according to the invention can be used in very low concentrations (25 ppm and below, based on the amount of polyether polyol to be prepared). If the polyether polyols prepared in the presence of the catalysts according to the invention are used for the preparation of polyurethanes (Kunststoffhandbuch, Vol. 7, Polyurethane, 3rd edition, 1993, p. 25 to 32 and 57 to 67), it is possible to dispense with removal of the catalyst from the polyether polyol without the product qualities of the resulting polyurethane being adversely affected.

The Examples which follow explain the invention but are not intended to be limiting.

EXAMPLES

Catalyst Preparation

Example A

Preparation of a DMC Catalyst Using Glycerol Tricaproate (Catalyst A)

A solution of 12.5 g (91.5 mmol) of zinc chloride in 20 ml of distilled water is added, with vigorous stirring (24,000 rpm), to a solution of 4 g (12 mmol) of potassium hexacyanocobaltate in 70 ml of distilled water. Immediately thereafter, a mixture of 50 g of tert.-butanol and 50 g of distilled water is added to the suspension which has formed, and vigorous stirring is then carried out for 10 minutes (24,000 rpm). A mixture of 1 g of a glycerol tricaproate (Aldrich), 1 g of tert.-butanol and 100 g of distilled water is then added, and stirring is carried out for 3 minutes (1000 rpm). The solid material is isolated by means of filtration, then stirred for 10 minutes (10,000 rpm) with a mixture of 70 g of tert.-butanol, 30 g of distilled water and 1 g of the above glycerol tricaproate, and filtered again. Finally, the mixture is stirred for a further 10 minutes (10,000 rpm) with a mixture of 100 g of tert.-butanol and 0.5 g of the above glycerol tricaproate. After filtration, the catalyst is dried at 50° C. and normal pressure until constant weight is reached.

Yield of dry, powdered catalyst: 5.3 g

Elemental analysis, thermogravimetric analysis and extraction: cobalt=12.3%, zinc=27.0%, tert.-butanol=7.2%, glycerol tricaproate=3.7%

Example B

Preparation of a DMC Catalyst Using Glycerol Tricaprylate (Catalyst B)

The procedure of Example A was followed, but glycerol tricaprylate (Rilanit GTC®, Henkel) was used instead of the glycerol tricaproate from Example A.

Yield of dry, powdered catalyst: 5.0 g

Elemental analysis, thermogravimetric analysis and extraction: cobalt=12.4%, zinc=26.9%, tert.-butanol=8.6%, glycerol tricaprylate=8.4%

Example C

Preparation of a DMC Catalyst Using Pentaerythritol Tetracaprylate (Catalyst C)

The procedure of Example A was followed, but pentaerythritol tetracaprylate (Rilanit PEC 4®, Henkel) was used instead of the glycerol tricaproate from Example A.

Yield of dry, powdered catalyst: 4.0 g

Elemental analysis, thermogravimetric analysis and extraction: cobalt=13.8%, zinc=28.6%, tert.-butanol=9.9%, pentaerythritol tetracaprylate=8.6%

Example D

Comparison

Preparation of a DMC Catalyst Using Tert.-butanol Without a Carboxylic Acid Ester of Polyhydric Alcohols (Catalyst D, Synthesis According to JP 4 145 123)

A solution of 10 g (73.3 mmol) of zinc chloride in 15 ml of distilled water is added, with vigorous stirring (24,000 rpm), to a solution of 4 g (12 mmol) of potassium hexacyanocobaltate in 75 ml of distilled water. Immediately thereafter, a mixture of 50 g of tert.-butanol and 50 g of distilled water is added to the suspension which has formed, and vigorous stirring is then carried out for 10 minutes (24,000 rpm). The solid material is isolated by means of filtration, then stirred for 10 minutes (10,000 rpm) with 125 g of a mixture of tert.-butanol and distilled water (70/30; w/w), and filtered again. Finally, the mixture is stirred for a further 10 minutes (10,000 rpm) with 125 g of tert.-butanol. After filtration, the catalyst is dried at 50° C. and normal pressure until constant weight is reached.

Yield of dry, powdered catalyst: 3.08 g

Elemental analysis: cobalt=13.6%, zinc=27.4%, tert.-butanol=14.2%

Preparation of Polyether Polyols
General Procedure 50 g of polypropylene glycol starter (molecular weight= 1000 g/mol) and from 3 to 5 mg of catalyst (from 15 to 25 ppm, based on the amount of polyether polyol to be prepared) are placed under a protective gas (argon) in a 500 ml pressurised reactor and heated to 105° C., with stirring. Propylene oxide (approximately 5 g) is then metered in in a single batch until the total pressure has risen to 2.5 bar. No further propylene oxide is then metered in until an accelerated pressure drop in the reactor is observed. That accelerated pressure drop indicates that the catalyst is activated. The remaining propylene oxide (145 g) is then metered in continuously at a constant total pressure of 2.5 bar. When metering in of the propylene oxide is complete and after a subsequent reaction time of 2 hours at 105° C., volatile portions are distilled off at 90° C. (1 mbar) and then cooled to room temperature.

The resulting polyether polyols were characterised by determination of the OH numbers, the double bond contents and the viscosities.

The progress of the reaction was monitored by means of time-conversion curves (propylene oxide consumption [g] vs. reaction time [min]). The induction time was determined from the point of intersection of the tangent at the steepest point of the time-conversion curve with the extended base line of the curve. The propoxylation times, which are of decisive importance for the catalyst activity, correspond to the period of time between activation of the catalyst (end of the induction time) and the end of propylene oxide metering. The total reaction time is the sum of the induction time and the propoxylation time.

Example 1

Preparation of Polyether Polyol Using Catalyst A (15 ppm)

| | | |
|---|---|---|
| induction time: | | 210 min |
| propoxylation time: | | 275 min |
| total reaction time: | | 485 min |
| polyether polyol: | OH number (mg of KOH/g): | 29.8 |
| | double bond content (mmol/kg): | 6 |
| | viscosity 25° C. (mPas): | 965 |

Without removal of the catalyst, the metal content in the polyol is: Zn=4 ppm, Co=2 ppm.

Example 2

Preparation of Polyether Polyol Using Catalyst B (25 ppm)

| | | |
|---|---|---|
| induction time: | | 180 min |
| propoxylation time: | | 115 min |
| total reaction time: | | 295 min |
| polyether polyol: | OH number (mg of KOH/g): | 29.6 |
| | double bond content (mmol/kg): | 9 |
| | viscosity 25° C. (mPas): | 914 |

Example 3

Preparation of Polyether Polyol Using Catalyst C (25 ppm)

| | | |
|---|---|---|
| induction time: | | 130 min |
| propoxylation time: | | 145 min |
| total reaction time: | | 275 min |
| polyether polyol: | OH number (mg of KOH/g): | 29.4 |
| | double bond content (mmol/kg): | 9 |
| | viscosity 25° C. (mPas): | 917 |

Comparison Example 4

Catalyst D (15 ppm) exhibits no activity under the reaction conditions described above.

Examples 1 to 3 show that, on account of their markedly increased activity in the preparation of polyether polyols, the novel DMC catalysts according to the invention can be used in such low concentrations that it is possible to dispense with separation of the catalyst from the polyol.

What is claimed is:

1. A double-metal cyanide catalyst comprising:
   a) at least one double-metal cyanide compound;
   b) at least one organic complex ligand which is not an ester of 1,2,3-propanetriol, 1,1,1-trimethylolpropane, pentaerythritol, maltose or sorbitan with $C_2$–$C_{18}$-alkylcarboxylic acids; and c) at least one ester of 1,2,3-propanetriol, 1,1,1-trimethylolpropane, pentaerythritol, maltose or sorbitan with $C_2$–$C_{18}$-alkylcarboxylic acids.

2. The catalyst according to claim 1, further comprising water and/or one or more water-soluble metal salts.

3. The catalyst according to claim 1, wherein the double-metal cyanide compound is represented by the general formula:

$$M_x[M'_{x'}(CN)_y]_z$$

wherein

M is defined as $M(X)_n$;

M' is defined as $(Y)_a M'(CN)_b (A)_c$; and x, x', y and z are integers and are so selected that the double metal cyanide compound has electro-neutrality.

4. The catalyst according to claim 3, wherein M comprises Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and/or Cr(III).

5. The catalyst according to claim 3 wherein M' comprises Fe(II), Fe(III), Co(II), Co(III), Cr(II), Cr(III), Mn(II), Mn(III), Ir(III), Ni(II), Rh(III), Ru(II), V(IV) and/or V(V).

6. The catalyst according to claim 3, wherein x=3, x'=1, y=6 and z=2.

7. The catalyst according to claim 3, wherein the double-metal cyanide compound is zinc hexacyanocobaltate (III).

8. The catalyst according to claim 1, wherein the organic complex ligand comprises an alcohol, aldehyde, ketone, ether, ester, amide, urea, nitrile, sulfide and/or a mixture thereof.

9. The catalyst according to claim 8, wherein the organic complex ligand is tert.-butanol.

10. The catalyst according to claim 1, wherein the carboxylic acid ester of polyhydric alcohol is present in an amount of from about 1 to about 50 wt. %, based on the amount of finished catalyst.

11. The catalyst according to claim 1, wherein the carboxylic acid ester of polyhydric alcohol is present in an amount of from about 1 to about 20 wt. % based on the amount o finished catalyst.

12. The catalyst according to claim 1, wherein the ester is a mono-, di- or tri-ester of 1,2,3-propanetriol; a mono-, di-, tri- or tetra-ester of pentaerythritol; or a mono-, di-, tri- or tetra-ester of sorbitan with $C_2$–$C_{18}$-alkylcarboxylic acids.

13. A process for the preparation of a double-metal cyanide catalyst according to claim 1, comprising the steps of: (a) reacting, in aqueous solution, (i) at least one metal salt, (ii) with at least one metal cyanide salt, in the presence of (iii) at least one organic complex ligand, which is not an ester of 1,2,3-propanetriol, 1,1,1-trimethylolpropane, pentaerythritol, maltose or sorbitan with $C_2$–$C_{18}$-alkylcarboxylic acids, to form a suspension; and (b) treating the suspension with at least one ester of 1,2,3-propanetriol, 1,1,1-trimethylolpropane, pentaerythritol, maltose or sorbitan with $C_2$–$C_{18}$-alkylcarboxylic acids.

14. A process according to claim 13, further comprising the steps of: (a) isolating the catalyst; (b) washing the isolated catalyst; and (c) drying the isolated catalyst.

15. A process for the production of a polyether polyol by polyaddition of an alkylene oxide onto a starter compound containing active hydrogen atoms in which the polyaddition of alkylene oxide is conducted in the presence of the double-metal cyanide catalyst of claim 1.

* * * * *